United States Patent [19]

King et al.

[11] 4,154,049
[45] May 15, 1979

[54] METHOD AND APPARATUS FOR FORMING OPTICAL CABLES

[75] Inventors: Frederick D. King, Smiths Falls; Tomasz S. Swiecicki, Pointe Claire, both of Canada

[73] Assignee: Northern Telecom Limited, Montreal, Canada

[21] Appl. No.: 913,657

[22] Filed: Jun. 8, 1978

[51] Int. Cl.² .................... D02G 3/44; D01H 13/04; G02B 5/16
[52] U.S. Cl. .......................... 57/9; 57/200; 57/352; 350/96.23
[58] Field of Search ............ 57/3, 6, 9, 11, 12, 57/13, 17, 18, 34 R, 34 AT, 106, 140 R, 140 E, 144, 160, 163; 350/96.23, 96.24, 96.29, 96.34

[56] References Cited
U.S. PATENT DOCUMENTS

| | | |
|---|---|---|
| 2,501,457 | 3/1950 | Thelin ............................ 57/9 X |
| 2,825,260 | 3/1958 | O'Brien .......................... 57/140 G |
| 3,187,495 | 6/1965 | Christian ........................ 57/160 X |
| 3,905,852 | 9/1975 | Mukai et al. .................... 350/96.1 X |
| 4,054,365 | 10/1977 | Marx .............................. 350/96.23 |

FOREIGN PATENT DOCUMENTS 2312788  5/1975  France ................... 350/96.23

*Primary Examiner*—Donald Watkins
*Attorney, Agent, or Firm*—Sidney T. Jelly

[57] ABSTRACT

An optical cable is assembled by inserting dielectric optical waveguides into a filament having periodically reversing helical grooves. Dielectric optical waveguide is unwound from fixed reels by movement of the filament past the reels. A rotatable guide unit has flexible tubes through which dielectric optical waveguide is guided, the tube ends being disposed within the grooves so that respective dielectric optical waveguides and grooves are maintained circumferentially coincident.

8 Claims, 6 Drawing Figures

U.S. Patent  May 15, 1979  4,154,049
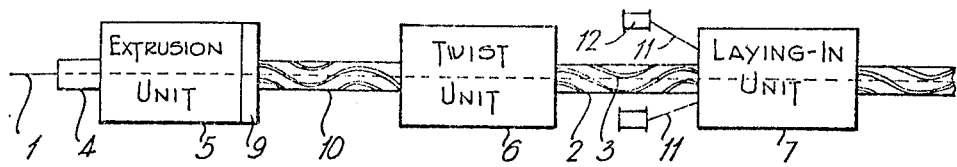
Fig-2
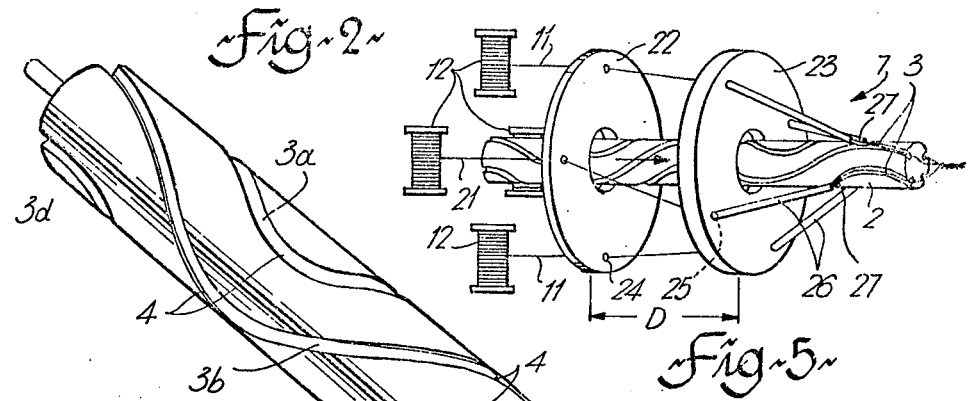
Fig-1
Fig-5
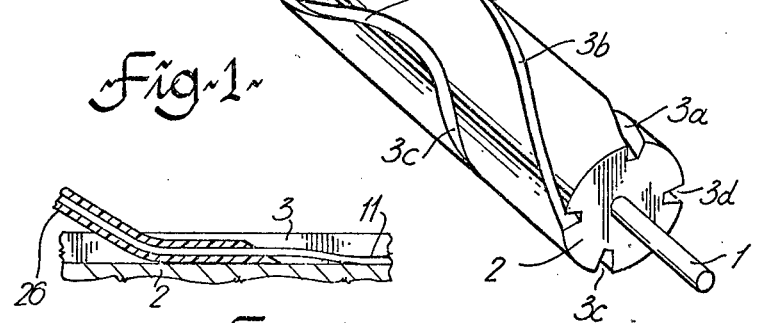
Fig-6
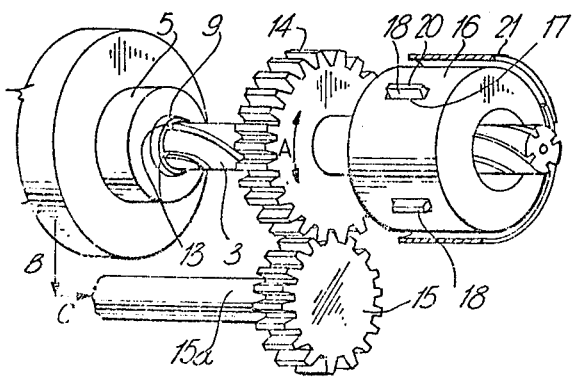
Fig-3
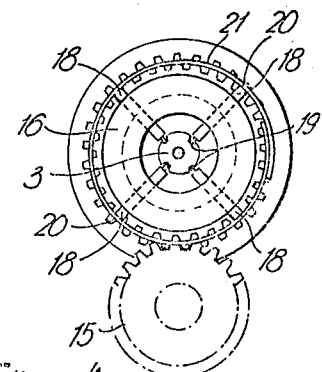
Fig-4

METHOD AND APPARATUS FOR FORMING OPTICAL CABLES

This invention relates to a method and apparatus for use in the assembly of optical cables.

It has been previously proposed to manufacture optical cables having a central strength member of, for example, steel wire, a plastics outer sleeving extruded around the steel wire and a series of grooves formed in the surfaces of the plastic sleeving, each groove containing a dielectric optical waveguide.

In order to ensure that dielectric optical waveguides are not subject to destructive tensile and compressive stresses wherever the cable is bent, the grooves are made in helical form. Thus at a curved part of a cable a dielectric optical waveguide experiences alternately compression and tension and over the length of the curve, the stresses at least partially cancel out.

The manufacturing steps for such cable include production of a grooved, plastics-coated metal strength member to provide a central filament for the cable, and the laying of dielectric optical waveguides into the grooves in the central filament. In the former, a known practice is to extrude the plastics through a rotating die, a servo mechanism being utilized to maintain the correct ratio of die angular velocity to the extrusion rate of filament in order to maintain the pitch of the helices within a predetermined range throughout the length of the central filament. It is necessary to limit the extrusion rate in order to guard against adverse shear affects resulting when the plastics, as it is extruded in one direction, is directed rapidly in a different direction. Care must also be taken in choosing an extrusion rate to avoid collapse of the grooved structure immediately the malleable, high temperature plastics exits from the die.

To lay dielectric optical waveguides into an appropriately grooved central filament, a planetary stranding technique has been adapted. In such a technique for laying in, said ten dielectric optical waveguides, ten reels of dielectric optical waveguide are mounted on a rotatable jig with the central filament being led through the centre of the jig. The reels revolve around the longitudinally moving filament with an angular velocity commensurate with both the pitch of the helical grooves and the velocity of the central filament. In effect therefore a reel follows a groove around as the central filament is fed through the jig. A suitable locating device presses payed out dielectric optical waveguide into the grooves.

Rotation of the reels and their motion around the central filament does, however, introduce a twist into the laid dielectric optical waveguide which is unacceptable because of the internal stresses which result. To compensate for this the reels are themselves rotated so that the undesirable twist in the dielectric optical waveguide is pre-empted. The nature of the movement of the reels somewhat resembles a planet system and accounts for the name given to this technique.

It will be appreciated that a complex servo mechanism is required to correctly interrelate the speeds at which:

(1) the centre filament is fed through the jig;
(2) dielectric optical waveguide is payed out;
(3) the jig is rotated, and
(4) the reels are rotated.

An optical cable structure forming the subject of our co-pending patent application Ser. No. 913,819, filed Sept. 7, 1978 permits the simplification of operating techniques for manufacture of optical cable. In the co-pending application there is disclosed a filament for an optical cable, the filament having a grooved surface, the grooves being in the form of helices, each helix changing hand along the filament.

The filament structure enables a relatively simple technique, for laying dielectric optical waveguides into the filament grooves. For use in the technique, apparatus comprises a plurality of dielectric optical waveguide stores, which can be reels, the stores being fixedly located around a feedpath for the filament, a reciprocally rotatable guide means located radially outwardly of said feed path for guiding individual dielectric optical waveguides from the stores to respective grooves and a locating device for positioning individual optical waveguides into said grooves. Dimensions of the helices can be so chosen that the periodic change of hand produces no net circulation of a groove around a longitudinal axis of the filament. Clearly, this obviates the need for rotation of the individual dielectric optical waveguide stores or reels.

The locating device preferably takes the form of a circular array of flexible tubes, each tube being adapted to accommodate a dielectric optical waveguide and having one end mounted at the guide means and its other end urged into and substantially parallel to a respective groove. The guide means can be a plurality of longitudinally spaced, relatively-rotatable guide units and a drive system producing differential rotation of the guide units. In this way total angular movement of dielectric optical waveguides in passing through the guide means can be phased between guide units. In a further aspect of the invention there is provided a method of laying dielectric optical waveguides into the filament defined to produce an optical cable, comprising feeding filament along a path, paying out dielectric optical waveguides from fixed stores distributed around said path, leading payed out dielectric optical waveguides from respective stores into respective grooves through guide means located radially outwardly of the path, and rotating the guide means firstly in one direction and subsequently in the opposite direction so that individual dielectric optical waveguides circumferentially follow respective ones of the filament grooves where the dielectric optical waveguides exit from the guide means.

An embodiment of the invention will be described by way of example with reference to the accompanying drawings, in which:

FIG. 1 is a perspective view of a length of filament according to the invention;

FIG. 2 is a schematic representation of apparatus for making such a filament and laying dielectric optical waveguides into grooves in the filament;

FIGS. 3 and 4 are respectively a perspective view and an end view of part of the apparatus for twisting extruded material to produce the filament; and FIG. 5 is a perspective view of apparatus for laying dielectric optical waveguides into the filament;

FIG. 6 shows an optical fiber guide means positioned within a groove of the filaments.

Referring to the drawings in detail, a filament for an optical cable has a central steel wire strength member 1 and, extruded over the strength member 1, a sleeve 2 of high density polyethylene. Formed in the surface of the sleeve and extending throughout the length of the filament are a number, in this case four, circumferentially spaced grooves 3a, 3b, 3c and 3d. In use the grooves each accommodate a dielectric optical waveguide in a relatively loose fit, the whole being surrounded by an extruded plastics sheath (not shown). In order to guard against breakage of dielectric optical waveguides where the optical cable is bent, the grooves are made to follow a helical path around the longitudinal axis of a filament. However, as shown at positions 4 the various helical paths followed by the grooves change hand (left to right or right to left) or lay direction. The grooves 3 are advantageously distributed evenly around the filament so the changes of hand of the four helical paths take place at the same specific positions along the length of the filament. The grooves thus have a generally parallel disposition relative to one another. As is evident from FIG. 1 the changes of hand take place at regular intervals along the filament.

Turning to FIG. 2, there is shown a schematic representation of apparatus used in the manufacture of an optical cable utilizing the filament described. Basically the apparatus comprises three units, an extrusion unit 5, a twist unit 6, and a laying-in unit 7. To manufacture, steel wire core 1 and a charge of high density polyethylene 8 are fed into an extrusion unit which includes a die 9 shown in greater detail in FIG. 3. The polyethylene 8 is heated until it is malleable and then extruded around the steel wire core 1 through the die 9 which is shaped to form grooves 10 in the polyethylene as it exits the extrusion unit 5. Some way downstream of the extrusion unit, the filament, having been cooled by a trough of cooling fluid (not shown) becomes relatively rigid and enters the twist unit which is operable to twist the filament, therefore introducing the helical form to the grooves where the polyethylene exits the extrusion unit.

Downstream of the twist unit 6 is the laying-in unit at which dielectric optical waveguide 11 which is payed out from reels 12 is set into the grooves 3.

Referring to the more detailed FIG. 3, molten polyethylene is extruded through the die 9 which has four inwardly projecting straight-walled fingers 13 to form the grooves 3. A twist unit 6 comprises a mechanism having a central cylindrical bore through which the extruded filament is pulled, the mechanism having at one end a gear 14 which is reciprocally rotatable and is driven by a drive gear 15 which forms part of a drive train from the extrusion unit, this being shown schematically by arrows B and C and drive shaft 16, the function of the drive train being to relate the speed of oscillation of the gear 14 to the extrusion rate of the extrusion unit 5. Alternatively the rates of extrusion and drive to the twist unit can be preset to obtain the required groove characteristics without the drive train B and C.

Integral with, and adjacent gear 14, is a barrel member 16 having a series of four evenly circumferentially spaced slots 17 extending through its wall. Slidably mounted within the slots for limited radial movement are four fins 18 having blades 19 of thin cross-section at their inner edges which project into the barrel 16. Outer edges 20 of the fins 18 are biased radially inwardly by a spring 21.

In operation of the twist unit 6, the blades 19 interengage in respective ones of the four grooves 3 where the extruded plastics is relatively cool and rigid and the drive train, via the gear 14, drives the barrel 16 to twist the filament 2. Since the extrusion unit does not rotate, the extruded polyethylene between the two units 5 and 6 undergoes a shear stress resulting in the grooves in the most malleable part of the polyethylene, i.e. as it exits from the extrusion unit 5, being deformed to provide the helical character. The change in hand of the individual helices is achieved merely by reversing the drive direction of the drive train.

The blades 19 are in an alternative embodiment, (not shown), replaced by miniature wheels which run in the grooves 3 in the filament 2 with somewhat less friction than do the blades 19.

In another alternative (not shown) the filament is gripped at its surface by three wheels of resilient composition. The arrangement is such that the wheels bear sufficiently strongly on the filament that it can be twisted by the twist unit but insufficiently strongly for the grooved surface structure to be permanently distorted.

FIG. 4 shows a practical embodiment of the unit 7 for laying dielectric optical waveguides 11 into the grooves 3 of a filament 2. Dielectric optical waveguide is payed out from four reels 12 which are evenly circumferentially spaced away from a path 21 along which the grooved filament 2 is drawn. The dielectric optical waveguides 11 are pulled from the reels by the movement of the filament itself as will be explained presently. The dielectric optical waveguides 11 pass through guide means comprising a pair of rotatable plates 22 and 23. The filament 2 is drawn through the centre of the two plates while the dielectric optical waveguides pass through the plates at circumferential evenly spaced apertures 24 and 25. The plate 23 is somewhat thicker than plate 22 and the apertures 25 are lined with tubes 26 which project from the downstream side of the plate 23. The tubes 26 are inclined towards the axis of the filament 2 and their ends 27 are flexible and pressed into respective grooves 3 so that as dielectric optical waveguide is drawn from the tubes by the filament being drawn past the laying-in unit 7, the dielectric optical waveguides are automatically located in the bases of the grooves 3. To aid the drawing out of dielectric optical waveguide, the outlet ends of the tubes are tapered, the tapered surface facing radially outward. In addition, the inlet ends of each of the tubes can be formed with a mouthpiece (not shown) to reduce friction effects where dielectric optical waveguide enters the tubes.

The circumferential position of the grooves 3, where they are engaged by tube ends 27, regulate the angular position of the plate 23. A geared drive shown schematically as arrow D relates the rotation of plate 22 to that of plate 23.

In operation the movement of filament 12 past the tube ends 27 produces rotation of plate 23 determined by the number of times a helical groove 3 extends around the longitudinal axis of the filament 2 between adjacent changes of hand or lay direction. The purpose of the second plate 22 is to prevent the four fibres from contacting each other and the central filament. The latter is undesirable since friction effects would make the pulling of fibre from the fixed reels 12 much more difficult. The presence of the plate 22 permits a phased winding of the dielectric optical waveguides 11 around each other and the central filament 2, but without there being any contact. If a number of turns are envisaged between each change of hand of the helical grooves 3 then a number of intermediate plates 22 can be sited between the plate 23 and the reels 12 with an appropriate gear drive.

In the embodiment described the drive is such as to produce angular rotation of θ/2 of plate 22 for every angular rotation θ of the plate 23.

What is claimed is:

1. Apparatus for laying dielectric optical waveguide into a filament to produce an optical cable, said filament having a surface defining a plurality of grooves, the grooves each having the form of a helix, each said helix changing hand along the filament, the apparatus comprising a plurality of dielectric optical waveguide stores fixedly located around a feedpath for the filament, a reciprocally rotatable guide means located radially outwardly of said feedpath for guiding individual dielectric optical waveguides from respective stores to respective grooves and a locating device for positioning individual dielectric optical waveguides into said grooves.

2. Apparatus as claimed in claim 1 wherein the stores are reels.

3. Apparatus as claimed in claim 1 wherein the locating device comprises a circular array of flexible tubes each tube having one end mounted at said guide means and its other end urged into and substantially parallel to a respective groove.

4. Apparatus as claimed in claim 3, wherein each tube at said one end is formed with a mouthpiece.

5. Apparatus as claimed in claim 3, where the other end of each tube has a tapered end surface, each tapered surface facing radially outwardly of the feedpath.

6. Apparatus as claimed in claim 1 wherein the guide means has a plurality of longitudinally spaced, ralatively-rotatable guide units and a drive system producing differential rotation of the guide units.

7. Apparatus as claimed in claim 5, wherein the drive system comprises a geared system having gear ratios such as to distribute total angular movement of dielectric optical waveguides in passing through the guide means, evenly between the guide units.

8. A method of laying dielectric optical waveguides into a filament to produce an optical cable, said filament having a surface defining a plurality of grooves, the grooves each having the form of a helix, each said helix changing hand along the filament, the method comprising feeding filament along a path, paying out dielectric optical waveguides from fixed stores distributed around said path, leading paid out dielectric optical waveguides from respective stores into respective grooves through guide means located radially outwardly of the path, and rotating the guide means firstly in one direction and subsequently in the opposite direction so that individual dielectric optical waveguides circumferentially follow respective ones of the filament grooves where the dielectric optical waveguides exit from the guide means.

* * * * *